Dec. 1, 1970  J. C. MILNE  3,544,883
VOLTAGE STABILIZATION SYSTEM UTILIZING A BUCK-BOOST GENERATOR
Filed Nov. 14, 1968                                    3 Sheets-Sheet 1
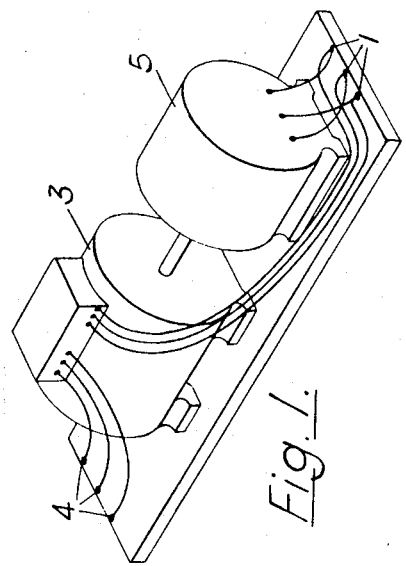
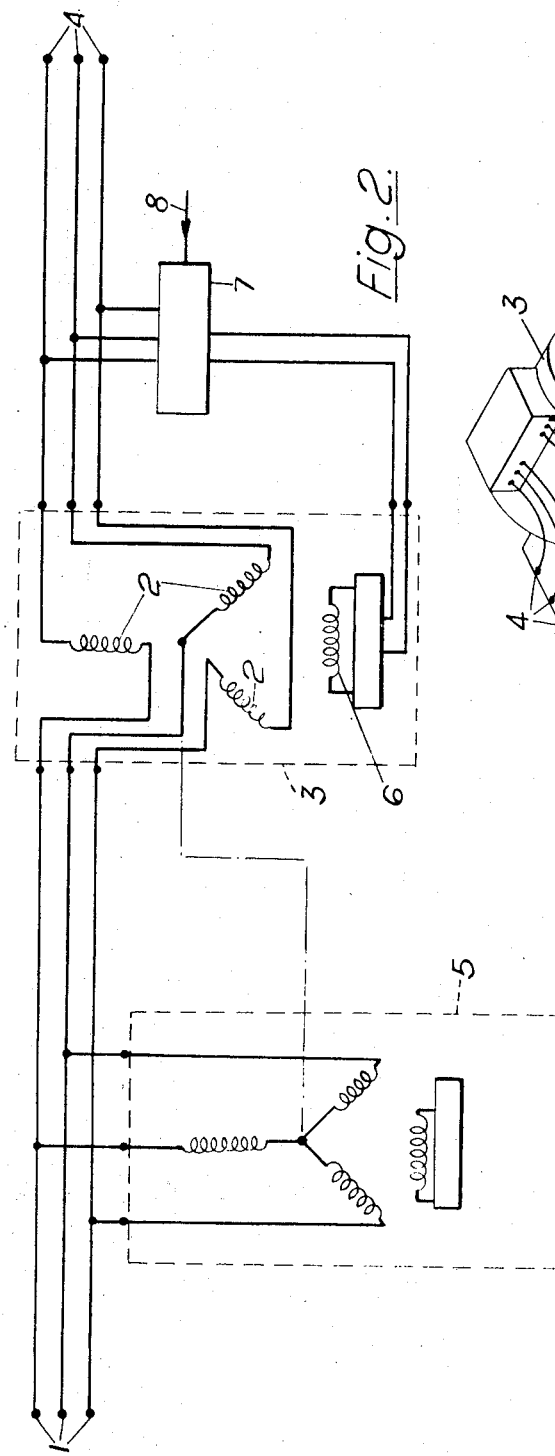
Inventor
*John Charlie Milne*
By
*Kenan, Palmer & Estabrook*
Attorneys

United States Patent Office 3,544,883
Patented Dec. 1, 1970

3,544,883
VOLTAGE STABILIZATION SYSTEM UTILIZING A BUCK-BOOST GENERATOR
John C. Milne, Wolverhampton, England, assignor to Electric Construction (W'ton) Limited, Wolverhampton, England, a British company
Filed Nov. 14, 1968, Ser. No. 775,770
Int. Cl. G05f 1/12
U.S. Cl. 323—5    3 Claims

ABSTRACT OF THE DISCLOSURE

A voltage stabilized electrical output is produced from an unstabilized voltage alternating current supply by injecting into the supply voltage a voltage of the same frequency generated by an A.C. generator driven by a synchronous electric motor from the supply to boost or buck the supply voltage. A voltage regulator controls this operation by sensing the output voltage and controlling the generator field accordingly.

---

Computers are a common example of electrical equipment which require an electrical supply having a stabilized voltage as well as a stabilized frequency. The normal alternating current mains supply provides the stabilized frequency but not a stabilized voltage since voltage variations are liable to occur, caused for instance by severe transients generated by suddenly applied external loads. It is therefore normal practice to supply a computer by way of a motor generator set comprising a synchronous electric motor driven from the mains supply coupled to an A.C. generator, the output voltage of which is sensed by a voltage regulator controlling the generator field so as to stabilize the output voltage. If the computer requires for example 50 k.v.a., then a 50 k.v.a. motor generator set together with its associated equipment is required and represents an appreciable addition to the overall cost of the installation.

According to the present invention a voltage stabilized electrical output is produced from an unstabilized voltage alternating current supply by injecting a voltage of the same frequency as the supply and generated by an A.C. generator driven by a synchronous electric motor from the supply into the supply voltage to boost or buck the latter under the control of a voltage regulator which, by sensing the output voltage and by corresponding control of the generator field, stabilizes the output voltage. Whether the generator voltage boosts or bucks the supply voltage, that is to say is added to it or is subtracted from it, in the latter case usually by adding the voltages after a 180° phase shift relative to one another, the generator contributes only a proportion of the output voltage since the remainder is the unstabilized supply voltage. The proportion which the generator has to contribute for stabilization depends on the maximum voltage variation liable to occur in the supply voltage. In most cases this variation is comparatively small, for instance 5% of the supply voltage, so that the voltage and thus the power which the generator has to contribute to stabilize the supply voltage is correspondingly small. Accordingly a comparatively small motor generator set is required compared to that required for the conventional method of stabilization, thus leading to corresponding economies in the overall cost of installation and subsequent maintenance.

A synchronous motor A.C. generator set in accordance with the invention has a generator output frequency which is the same as the supply frequency and includes for each phase of the supply a respective low impedance current path which connects the input and output terminals of the set and includes one of the generator armature windings by means of which the generator voltage is injected into the supply voltage to boost or buck the latter when the set is operating, and a voltage regulator for sensing and, by corresponding control of the generator field, for stabilizing the output voltage of the set. The generator armature windings, being in series with a load connected to the set, provide a filtering action to transient voltages. In most cases the armature windings of a small generator are in themselves sufficient for this purpose but if necessary a filter network of which the windings form a part may be included.

It is of course important that the stabilizing action of the set should occur sufficiently quickly to prevent transmission of transients, or, as the case may be, of dangerous transients. Whether transients are dangerous or not clearly depends on the characteristics of the load supplied by the set. If this is a computer operating from D.C. obtained from the set after rectification comparatively short duration transient variations are acceptable if the capacitors in the rectifiers are capable of smoothing out these variations. It is found in practice that if the voltage regulator is normally at "cut-off," that is to say supplies field current to the generator only when the output voltage, in the case of boosting, drops below the required voltage, then the speed of response may be insufficient to give the necessary stabilization. This difficulty can be avoided by arranging for the generator to operate continuously. In most cases this necessitates the provision of an autotransformer connected in the current path or paths between the generator armature winding or windings and the output terminals of the set for altering the boosted or bucked voltage to the supply voltage. It will be understood that if the generator always operates, the supply voltage is always bucked or boosted to a greater or lesser extent so that if the supply voltage is, in fact, correct, the boosted voltage has to be reduced to make it equal to the supply voltage. Similarly if the supply voltage is always bucked, an autotransformer is usually required to increase the generator voltage to make it equal to the supply voltage.

By way of example, synchronous motor generator sets in accordance with the invention will now be described in more detail with reference to the accompanying drawings in which:

FIG. 1 is a perspective view of one such set;

FIG. 2 is a simplified electrical circuit diagram of the set shown in FIG. 1;

Figure 3:
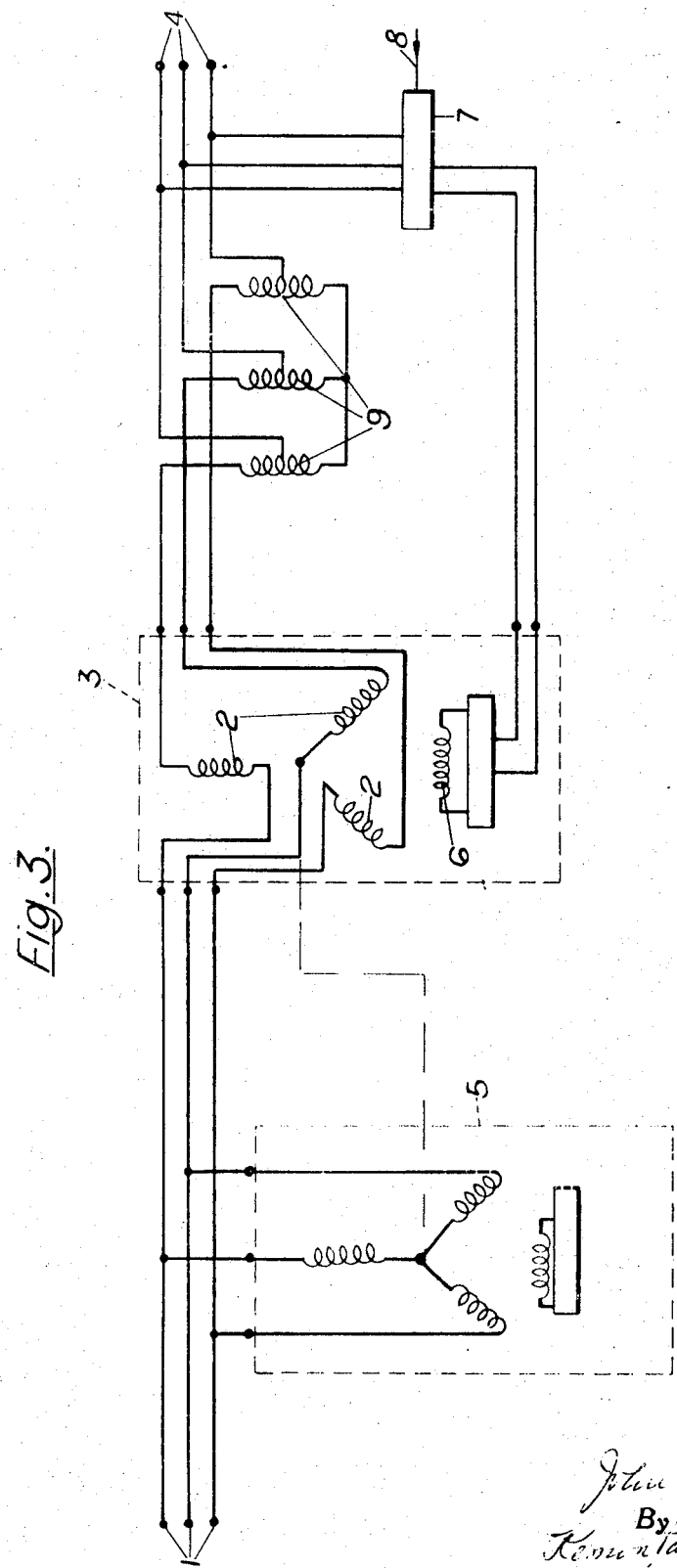
FIG. 3 is a simplified electrical circuit diagram of another such set incorporating an autotransformer.

Reference should first be made to FIG. 1 in which the set illustrated is designed to operate from a three-phase, 50 c./s., 415 volts supply and to produce a stabilized voltage and frequency of the same values. The set includes a three-phase generator 3 mechanically coupled to a synchronous three-phase reluctance motor 5. As shown in FIG. 2 the set has three input terminals 1 for each of the three phases each directly connected through a respective armature winding 2 of the generator 3 to a respective output terminal 4. The generator 3 is wound for low voltages since it has to generate only a low voltage while transmitting a relatively high current. The motor 5 is connected to be energized from the terminals as shown. The generator 3 includes a field winding 6, the current in which is controlled by a voltage regulator 7 which senses the line voltage developed across the output from the generator 3. A reference input 8 enables the voltage regulator 7 to be adjusted so that the output voltage developed at the terminals 4 can be controlled.

As previously described, in operation, the main supply current flows from the terminals 1 to the terminals 4 through the three armature windings 2 of the generator 3. The motor 5 is driven at synchronous speed and accordingly drives the generator 3 at the same speed. If the voltage at the terminals 4 drops below that required by the input 8 to the regulator 7, the regulator causes an appropriate current to flow in the field winding 6 of the generator so that the generator generates a voltage which is added to and thus boosts the supply voltage so as to counteract the departure from the supply voltage.

It can thus be seen that in the set illustrated in FIG. 2, current flows in the field winding 6 only if the output voltage of the set departs from the desired voltage. As previously indicated, such a set is likely to have a fairly lengthy response time, for instance ten cycles, which may be too great for certain applications. A set which represents an improvement in this respect is illustrated in FIG. 3. This set is identical to that shown in FIG. 2, corresponding components being indicated by like reference numerals, except that it includes a three-phase autotransformer 9. It will be assumed that the maximum voltage drop liable to occur on the supply is 35 volts. The voltage regulator 7 is arranged so that when it senses the correct voltage, that is to say 415 volts, it causes a current to flow through the field winding 6 sufficient to add 5 volts to the supply voltage. The autotransformer 9 is arranged to reduce the voltage by 5 volts. Thus if the supply voltage is correct, the voltage at the output of the generator is 420 while that at the output of the set is 415. If the maximum voltage drop on the supply occurs, that is to say the supply voltage drops to 380 volts, then the instantaneous output from the set is approximtely 375 volts which is sensed by the voltage regulator 7 which causes a current to flow in the field winding 6 sufficient to add 40 volts to the supply voltage so that the generator output is 420 volts. The autotransformer reduces this by 5 volts so that the output voltage from the set quickly becomes stabilized at the correct voltage of 415 volts.

As previously indicated, instead of serving to boost the supply voltage, the generator voltage may buck the supply voltage, that is to say reduce it. For instance if a stabilized voltage lower than the supply voltage is required, such a set can be employed. The set shown in FIG. 2 would under these circumstances require modification to delay the phase of the voltage generated by the generator 3 by 180° with respect to the supply voltage. Addition of two voltages which are 180° out of phase is of course equivalent to substraction of in-phase voltages.

Figure 4:
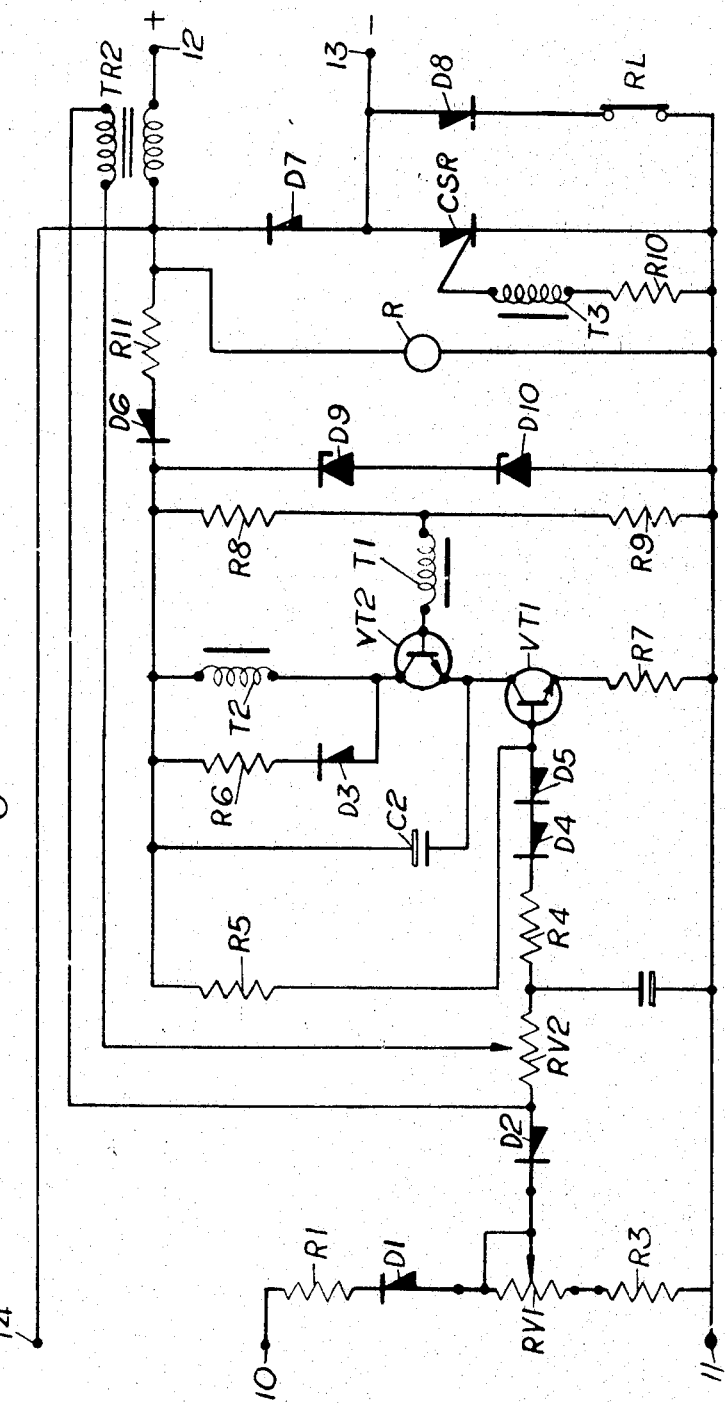
FIG. 4 is an electrical circuit diagram indicating the manner of operation of the voltage regulator incorporated in both sets.

The voltage regulator shown in FIGS. 2 and 3 incorporates a circuit which is shown in FIG. 4. This circuit has input terminals 10 and 11 which are respectively connected across two of the output terminals of the set, and positive and negative output terminals 12 and 13 respectively which are connected to the field winding terminals of the generator 3. The circuit also has a neutral terminal 14.

The voltage regulator operates only during half-cycles when the terminal 11 is positive with respect to the terminal 10. By means of a resistor R3, a potentionmeter RV1, a diode D1 and a resistor R1, a proportion of the line voltage is obtained across the slider of the potentiometer RV1 and the resistor R3. Current flows to the slider from the neutral point 14 through a resistor R11, a diode D6, a resistor R5, diodes D4 and D5, a resistor R4, a potentiometer RV2 and a diode D2. Due to the stabilizing effect of Zener diodes D9 and D10, the signal at the base of a transistor VT1 is directly dependent on the position of the slider of the potentiometer RV1 and also on the line voltage developed across the terminals 10 and 11. Thus for any given position of the slider, the collector-emitter resistance of the transistor VT1 depends on the line voltage. This transistor is connected in series with a capacitor C2 to form a timing circuit. In this way the potential at the collector of the transistor VT1 rises, starting at the beginning of each half-cycle, at a rate which is dependent on the line voltage. At a certain potential, a transistor VT2 switches to a conducting state. The base of this transistor biased by resistors R8 and R9 to the midpoint of which it is connected by one winding T1 of a three-winding transformer. Switch-on of this transistor is regenerative by feedback from the winding T1 to the second transformer winding T2 connected to the collector. The third transformer winding T3 is connected in series with a resistor R10 between the cathode and the gate of a thyristor CSR. A pulse is generated in the winding T3 when the transistor VT2 switches on and this pulse switches on the thyristor CSR which thus conducts for the remainder of the half-cycle. Current thus flows from the terminal 14 through one winding T2 of the transformer to the terminal 12, through the field winding 6 to the terminal 13, and thence through the thyristor CSR to the terminal 10. It will be appreciated that once the thyristor is switched on, it can only be switched off by reducing the anode voltage to zero which occurs automatically when the A.C. supply passes through zero at the end of the half-cycle. It will be understood that the instant in any half-cycle at which the field current commences to flow and thus the average field current is dependent on the line voltage. The average field current and thus the output voltage from the set can be adjusted by adjustment of the slider of the potentiometer RV1.

The voltage regulator circuit includes a number of additional components as follows:

A resistor R6 and a diode D3 are provided to prevent high voltages being developed across the transistor VT2 during the switching interval. A transformer TR2 provides stabilization to prevent voltage hunting and to give optimum response. It has a secondary winding connected to the potentiometer RV2 by means of which the magnitude of the stabilizing signal can be adjusted. A relay R is included in the circuit and has contacts R1 in series with a diode D8. Due to residual magnetism, the generator normally produces a small voltage output when it is first started and this output is fed directly to the field winding through the diode D8 and the contacts R1. The relay R is arranged to open when the generator voltage has risen to about 60% of its nominal value, after which the field winding is controlled as previously described. The circuit also includes a diode D7 which free-wheels when the thyristor CSR is not conducting.

I claim:
1. A method of producing a voltage stabilized electrical output from an unstabilized voltage alternating current supply, in which a voltage of the same frequency as the supply and generated by an A.C. generator driven by a synchronous electric motor from the supply is injected into the supply voltage to boost or buck the latter under the control of a voltage regulator which, by sensing the output voltage and by corresponding control of the generator field, stabilizes the output voltage.

2. A synchronous motor A.C. generator set in which the generator output frequency is the same as the motor supply frequency, including for each phase of the supply a respective low impedance current path which connects the input and output terminals of the set and includes one of the generator armature windings by means of which the generator voltage is injected into the supply voltage to boost or buck the latter when the set is operating, and a voltage regulator for sensing and, by corresponding control of the generator field, for stabilizing the output voltage of the set.

3. A synchronous motor A.C. generator set according to claim 2 including an autotransformer connected in the current path or paths between the generator armature winding or windings and the output terminal or terminals for altering the boosted or bucked voltage to the supply voltage.

References Cited

UNITED STATES PATENTS

| | | | |
|---|---|---|---|
| 2,961,597 | 11/1960 | Carleton | 307—103X |
| 3,075,138 | 1/1963 | Croft et al. | 323—45 |
| 3,373,345 | 3/1968 | Han-Min Hung | 323—45 |

ORIS L. RADER, Primary Examiner

H. HUBERFELD, Assistant Examiner

U.S. Cl. X.R.

322—28; 323—10, 45